United States Patent [19]
Halligan et al.

[11] Patent Number: 6,041,394
[45] Date of Patent: Mar. 21, 2000

[54] DISK ARRAY WRITE PROTECTION AT THE SUB-UNIT LEVEL

[75] Inventors: Kenneth A. Halligan, Leominster; Erez Ofer, Brookline, both of Mass.

[73] Assignee: EMC Corporation, Hopkinton, Mass.

[21] Appl. No.: 08/935,458

[22] Filed: Sep. 24, 1997

[51] Int. Cl.[7] .................................................. G06F 13/14
[52] U.S. Cl. ......................... 711/166; 711/156; 711/114; 711/152
[58] Field of Search .................................... 711/122, 112, 711/166, 170, 111; 371/10.1; 395/182.05

[56] References Cited

U.S. PATENT DOCUMENTS

| | | | |
|---|---|---|---|
| 5,124,987 | 6/1992 | Milligan et al. | 371/10.1 |
| 5,636,359 | 6/1997 | Beardsley et al. | 711/122 |
| 5,787,459 | 7/1998 | Stallmo et al. | 711/112 |
| 5,809,224 | 9/1998 | Schultz et al. | 395/182.05 |
| 5,829,048 | 10/1998 | Ofer et al. | 711/166 |
| 5,854,942 | 12/1998 | Penokie | 711/170 |
| 5,890,204 | 3/1999 | Ofer et al. | 711/111 |

*Primary Examiner*—John W. Cabeca
*Assistant Examiner*—Fred F. Tzeng
*Attorney, Agent, or Firm*—Fish & Richardson P.C.

[57] ABSTRACT

A method and apparatus, for a system having a plurality of host computers and a memory system having a disk controller with at least one mass storage device having a plurality of logical volumes, provide for write protecting the logical volumes at the controller port level. The method features changing the write protect status of one or more logical volumes, on a port level basis, in response to a first host request to change a write protect status; writing a write protect status message to a memory associated with the controller channel directors; polling, from each channel director, the memory for an unread write protect status messages; and preventing, at, for example, the channel director port level, a host connected to the channel director from writing to a protected logical volume which is write protected from that host or host port. The write protect status of that channel director, for that logical volume, remains in effect until the write protect condition for that volume has been reset. A lock mechanism must be obtained to make any changes in the logical volume write protect status.

19 Claims, 3 Drawing Sheets

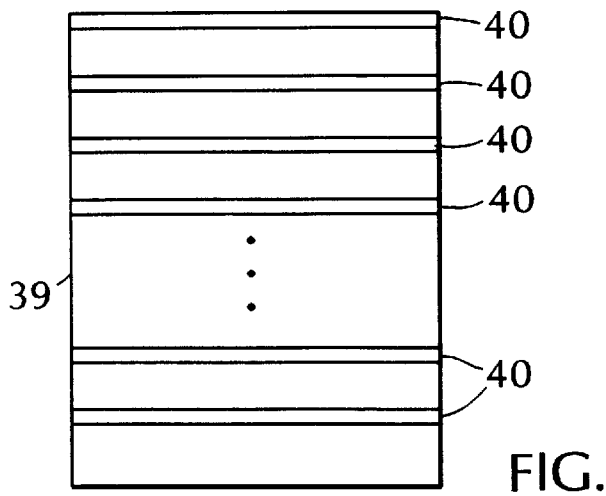
FIG. 4A
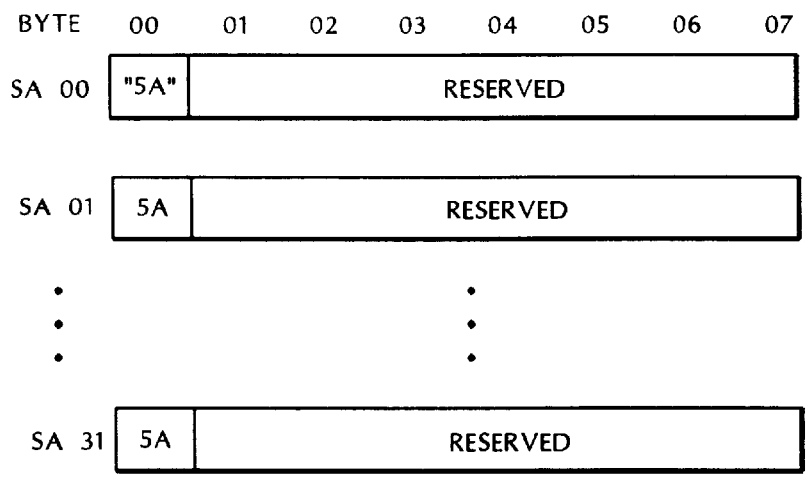
FIG. 4B
| BYTE(S) | BIT 7 | BIT 6 | BIT 5 | BIT 4 | BIT 3 | BIT 2 | BIT 1 | BIT 0 |
|---|---|---|---|---|---|---|---|---|
| 0 | PAGE CODE = 20h | | | | | | | |
| 1 | PAGE LENGTH = 06h | | | | | | | |
| 2 | P. | MODE | | | | | | |
| 3-7 | RESERVED | | | | | | | |
FIG. 4C
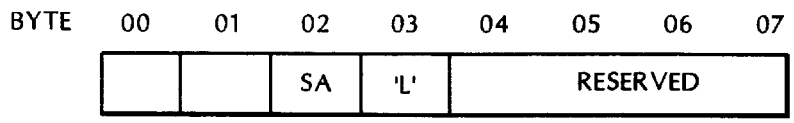
FIG. 4D

DISK ARRAY WRITE PROTECTION AT THE SUB-UNIT LEVEL

BACKGROUND OF THE INVENTION

The invention relates generally to mass storage memory systems, and more particularly, to a method and apparatus for write protecting logical volumes of a mass memory accessible by multiple host computers.

In a typical memory system employing, for example, a disk drive, the entire disk drive can be manually or electronically write protected in advance. For a floppy disk drive, this involves merely flipping a tab, and in a larger disk drive, such as the gigabit drives available today, the write protect can either be manually set at the drive itself, or electronically set by a user or customer engineer. In either case, the drive becomes write protected against all incoming write requests. In addition, the write protection is typically set in advance, so that the status of the drive, that is, what data has been written to the drive, must be known in advance.

Large disk drive memories are typically divided into a plurality of logical volumes. Thus, a single disk drive might have 4, 8, or more logical volumes. In addition, each of the logical volumes can be accessible by plural host computers. Thus, one host computer may be responsible for writing and maintaining a database in a first logical volume on the disk drive and other host computers are ordinarily only expected to read the database for their varying purposes and applications. Other host computers may be responsible for other logical volumes on the same disk drive unit.

In some smart disk drive controllers, such as the EMC Symmetrix disk drive controller, logical volumes were initially protected manually during operation. In these instances, however, the user or customer engineer must know in advance when the write operation(s) for data on the drive which is to be protected, has been completed, and thereafter, the user or customer engineer would write protect the logical volume or the entire drive manually.

In our copending U.S. patent application Ser. No. 08/831,481, filed on Mar. 31, 1997, and entitled DISK ARRAY WRITE PROTECTION AT THE SUB-UNIT LEVEL, the contents of which are incorporated herein by reference, there is described a write protect mechanism operable from the host computer. This invention is an improvement upon the invention described in our earlier copending application.

SUMMARY OF THE INVENTION

The invention relates to a system having a plurality of host computers, a disk controller system, and at least one mass storage disk device controlled by the controller and having a plurality of logical volumes. At least one of the logical volumes can be written to by at least two of the hosts through different ports of, for example, channel directors or SCSI adapters ("SA's") of the disk controller.

The method thus changes the write protect status of at least one logical volume accessible by the controller. The method features the steps of obtaining control of a write protect lock in response to a host request for a change in write protect status for at least one selected logical volume, the request being received from a first host; writing, in response to the first host request, a write protect message to a logical volume memory location associated with each logical volume which will be affected; setting a flag message in a message memory location indicating a change in one of the logical volume memory locations; polling the message memory location for set flag messages; writing, in response to a set flag message, in a local memory associated with a controller port for the requesting host, a status of at least all logical volumes accessible from the port; and preventing, at the controller, a host from writing to a protected logical volume as identified by data in the controller's local memory.

In another aspect, the apparatus of the invention features to a mass storage control system having a global memory, a plurality of channel directors, each channel director having at least one port and a local write status memory, each director being connected to the global memory and able to send and receive data and commands to and from at least one host computer, at each port; the global memory having a mailbox for each channel director which can read and write data to it; the global memory and the channel directors being configured so that each channel director can write data to each other channel director's mailbox in the global memory; each channel director ordinarily being able to received data and commands from a host and write the data to a logical volume of a mass storage disk drive system having a plurality of logical volumes. Each channel director, in response to a received logical volume write protect status change command from a host computer, obtains a write protect lock, writes a write protect status message to the mailbox within global memory of at least one channel director able to write to the logical volume, and writes any logical volume status change data to global memory. Each channel director periodically polls its mailbox for new write protect status messages; and each channel director responds to a new write protect message in its mailbox in the global memory by modifying a write protect data structure in its local memory.

The invention thus advantageously allows a host computer to protect, dynamically and on the fly, one or more logical volumes to which it needs to limit write access. In other aspects, the invention advantageously allows the write access limitation to be effected at the channel director port level, without the host knowing the storage system configuration.

BRIEF DESCRIPTION OF THE DRAWING

Other objects, advantages, and features of the invention will be apparent from the following description taken together with the drawings in which:

FIGS. 4A–4D are data structures useful in implementation of a particular embodiment of the invention.

DESCRIPTION OF A PREFERRED EMBODIMENT OF THE INVENTION

Figure 1:
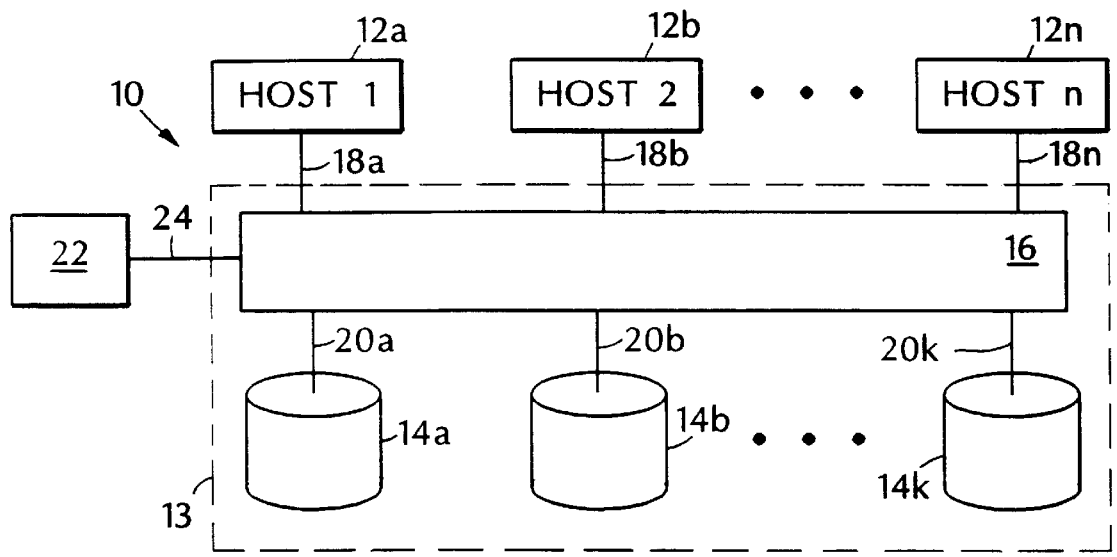
FIG. 1 is a system description in accordance with the invention describing the environment in which the invention operates.

Referring to FIG. 1, the invention relates to a computer system 10 which has a plurality of host computers 12a, 12b, . . . , 12n and a mass storage system 13 having a plurality of disk drive elements 14a, 14b, . . . , 14k. Interconnecting the host computers 12 and the disk drive elements 14 is a disk drive controller 16, for example, that made by EMC and known as the Symmetrix controller. The disk drive controller 16 receives memory commands from the various host computers over buses 18a, 18b, . . . , 18n respectively, for example, connected and operating in accordance with a SCSI protocol, and delivers the data associated with those commands to the appropriate disk drive elements 14 over respective connecting buses 20a, 20b, . . . 20k. Buses 20 also preferably operate in accordance with a SCSI protocol.

Each of the disk drive elements 14 typically has in excess of nine gigabytes of memory and is logically divided, in accordance with known techniques, into a plurality of logical volumes. Each disk drive element 14 can thus have a plurality of logical volumes, for example 4, 8, or more logical volumes on a single disk drive element. In a typical configuration, the controller system also connects to a console PC 22 through a connecting bus 24. Console PC 22 is used for maintenance and access to the controller and can be employed to set parameters of the controller as is well known in the art.

As indicated above, in operation, it can often occur that one host, for example host 12a, as well as a second host, for example host 12b, can each write not only to the same disk drive element, for example disk drive element 14a, but even to the same logical volume of that disk drive element. In accordance with the invention, one host computer can command, through the disk drive controller 16, and without knowing the host/disk drive element configuration, that a particular logical volume to which it has read and write privileges be write-protected against all other host computers, at, for example, in the Symmetrix device, the channel director port level.

Figure 2:
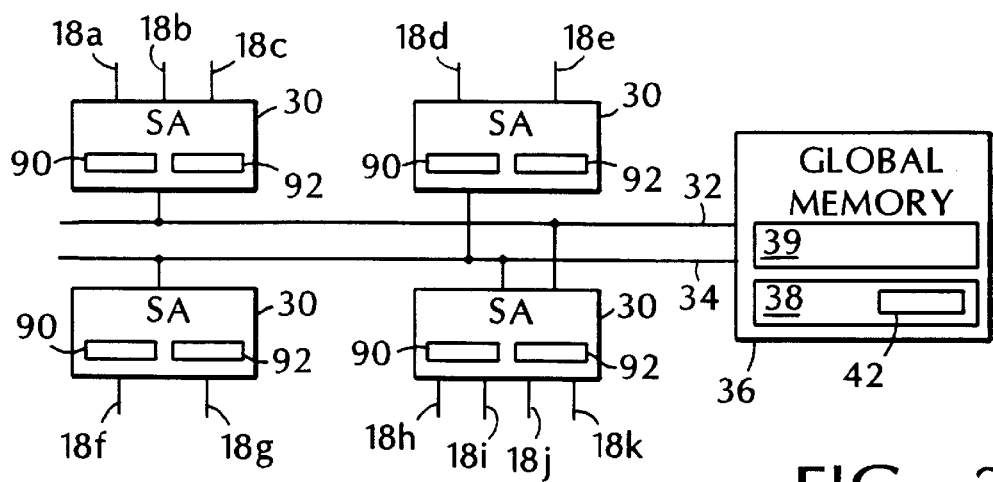
FIG. 2 is a block diagram showing the interconnection of various channel directors to the global memory in accordance with the invention.

Thus, referring to FIG. 2, within the disk controller 16 with which the invention is particularly useful, each host computer connects to a port of a channel director 30 (also referred to as a SCSI adaptor or SA) over the SCSI bus lines 18. Each channel director can have four or more ports. Each channel director in turn connects, over a one or more system buses 32 or 34, to a global memory 36. The global memory, preferably, is a large memory through which the channel directors can communicate to the disk drives, and it includes a portion acting as a cache memory for the system. The global memory also has therein a plurality of mailboxes 38, one mailbox for each channel director 30 and a section 39 of memory with a memory portion for each logical volume. Each mailbox, which physically consists of a portion of the global memory, can be read and written by each channel director.

The global memory section 39 contains typically plural separate device ID memories 40 (FIG. 4A), each ID memory being associated with a different logical volume of the disk drives to which the controller has access. Global memory also provides in the mailbox for each channel director, a write protect status buffer 42 (FIG. 4B) which the channel director will periodically poll to determine whether the write protection of any of the logical volumes to which it has access has changed. As will be described in more detail below, the write protection data is stored on a port by port basis for each channel director. A change in write protect status, in the illustrated embodiment, is signalled by a particular semaphore or flag in each write protect status buffer 42. Thus, each channel director can read its mailbox, and in particular, the mailbox slot relating to write protect messages, and determine whether write protection for any of the logical volumes it can access has changed. If there is a change, the channel director will access that information as described below, and store the retrieved data in its local memory and in a non-volatile memory. Thus, as will be described further below, the presence of a flag or semaphore at the write protect status message slot in a channel director's mailbox indicates that the write protect status for that channel director has changed since the last time that channel director read (or polled) the write protect status memory 42. After reading a status memory 42, the flag is reset.

Figure 3:
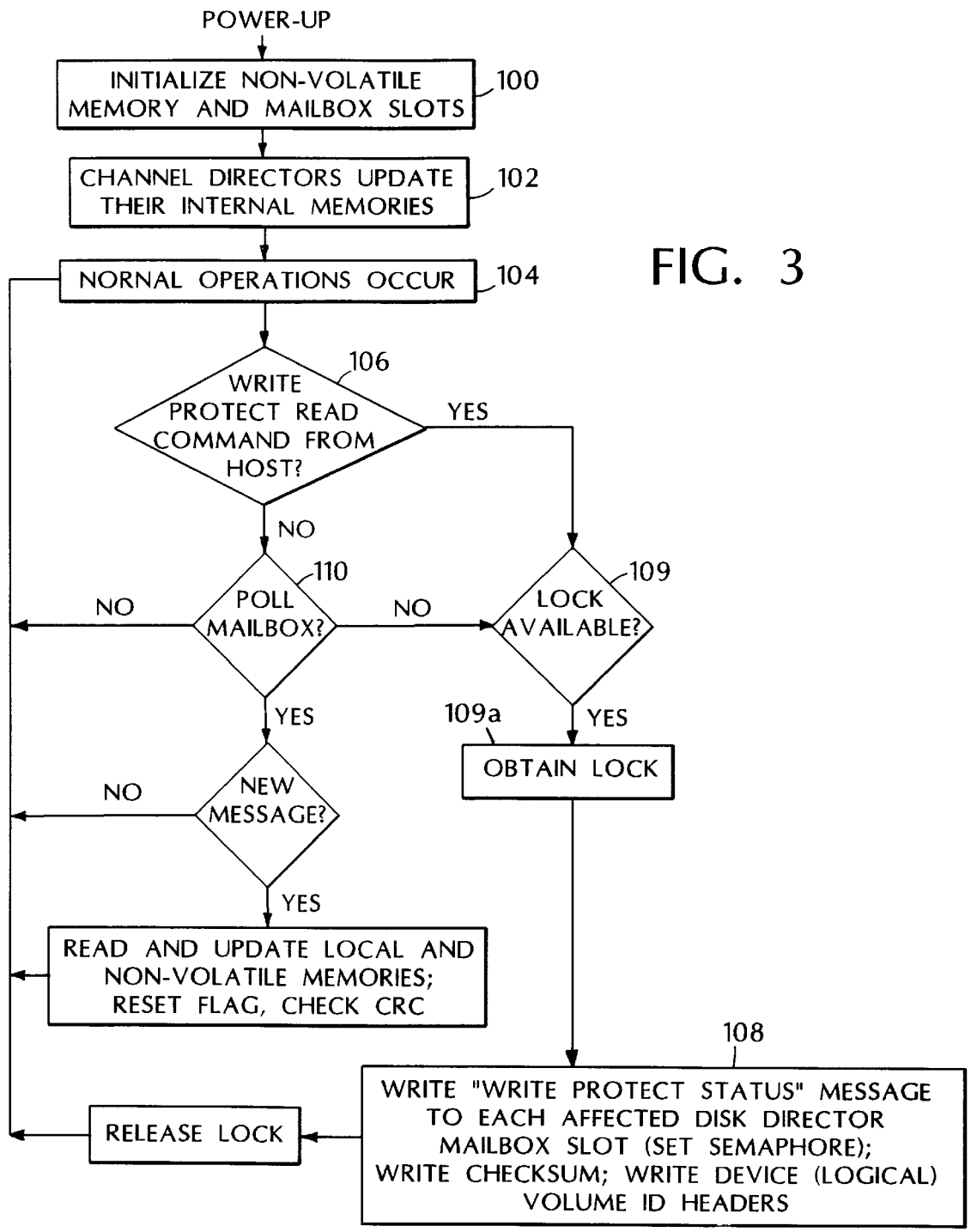
FIG. 3 is a flow chart illustrating the operation of a system in accordance with the invention.

Referring to FIG. 3, in operation, each of the write protect status messages, is initialized, in global memory, at first power-up, to zero. This is indicated at step 100. Further, the contents of a non-volatile memory 90 of each channel director 30, is also initialized to "zero" indicating that no logical drive is write protected. Finally the contents of each non-volatile memory is loaded into global memory in the device ID memory 40 for each logical volume or device in the system, and is loaded into a local memory at each channel director.

The write protect status information data in each non-volatile memory 90, is retained in the event of a power failure, and following a power loss, and following initial microcode loading, the information in each memory 90 is retrieved and placed, as noted above, in both global memory, at each device ID memory header (step 100), and in the local write protect status buffer memory within each channel director (step 102). Accordingly, after the initialization process (steps 100, 102), at turn-on, the non-volatile memories 90, the local write protect status buffer memories 92 within the channel directors, and the write protect device ID header 40 for each logical volume, stored in global memory, contain the same write protect status data. As a convention, upon initial turn-on, none of the logical volumes are write protected.

Thereafter, each channel director reads and writes through the global memory to the disk drives in accordance with "normal operation". This is indicated at 104. If a command is received from a host computer directing the write protect status of a particular logical volume to be changed, for example to be write protected, as tested at step 106, the channel director 30 to which the command is directed acts to implement the command as follows. Before examining the system operation, however, a mode select command (FIG. 4C) will first be described.

The SCSI mode select command provides, on one of its pages, a procedure for altering the write protect attributes of any or all logical volumes controlled by the channel director port. In a particular preferred embodiment of the invention, referring to the table of FIG. 4C, the mode select command, from the host, operates to modify the write protect status of all logical volumes which are visible from the port receiving the command or to modify only the one logical volume specified in the command.

In operation, in the illustrated embodiment of the invention, the command structure is illustrated in FIG. 4C. The value of "P" in FIG. 4C identifies whether the command only applies to the specific identified logical volume (P=0) or whether the command applies to all logical volumes that are visible from the effected port (P=1). In the "mode" section of the command, one of, for example, five codes can appear. A "00" code indicates that no operation will be performed. A "01" code value causes a write enable for all logical volume(s) seen from this port; a "02" value causes a write disable to be effected on all logical volume(s) seen from the port; a "03" value causes a write enable for all logical volume(s) seen from this port and a write disable for those logical volume(s) from all other ports; and a "04" value causes a write disable for all logical volumes seen from this port and a write enable for those logical volumes from any other connected and authorized port. It is important to recognize that the host computer need not know the configuration of the controller system, that is, which logical volumes are available at which ports, to use this command. That detailed information is available to the disk controller system, and is automatically accounted for by the controller as it implements the command. As a result, at 108, the controller (if it has the write protect lock) writes the write protect message and sets semaphores for each affected channel director (including the channel director receiving the command) and also writes in each affected device ID header 40 the correct (and changed if necessary) write protect status.

It is important to note, however, that in the preferred embodiment of the invention, as suggested above, the write protect status of a logical volume cannot be changed unless the channel director has the "write protect lock" as tested at step 109. To obtain the write protect lock, the channel director reads the write protect lock data structure (illustrated in FIG. 4D). If the write protect lock is held by another channel director, that channel director is identified in byte two and the value of byte three is set to the lock state. Otherwise, the value identified in byte three is in the unlock state, for example a "zero", and the inquiring channel director can obtain the lock (step 109*a*) and set the write protect lock data structure appropriately. In addition to obtaining lock and writing the new write protect status data in global memory device ID memory headers, for each logical volume to be affected, the writing channel director also, as noted above, sets the semaphore or flag by leaving a message for each other affected channel director. In the illustrated embodiment of the invention, the flag is a "5A" (in hexadecimal), placed in byte 0 of the message word for each channel director. It also, in the illustrated embodiment of the invention, leaves that message for itself as well. A typical structure for the message word is illustrated, for example, in FIG. 4B. Finally, after performing these tasks, the disk director returns the lock (resetting the lock data structure of FIG. 4D) (Step 100*b*) and returns to "normal operations" at 104. If the lock had not been available at 109, operational flow would have immediately returned to a polling operation at 110, and the command would have failed.

In the illustrated embodiment of the invention, approximately every half-second, each channel director polls, at 110, its mailbox to determine whether a write protect status change message 43 is waiting for it. If a new message is available, at 112, that message is "read", as indicated at 114, and the channel director's internal memory 92 and non-volatile memory 90 are updated. If no message is waiting, or if polling is not performed, control returns to "normal operations". In order to update its internal or local memory 92, the channel director scans the global device ID headers 40 of at least all logical volumes to which it has access, or, as in the illustrated embodiment, all logical volume ID headers, and rebuilds its internal status buffer local memory 92 and its non-volatile memory 90 on a port by port basis. It then clears or resets the flag or semaphore (here the "5A") in its mailbox status memory.

Thus, each channel director, including the channel director which wrote the write protect status charge message, will, after polling its mailbox, and finding a set flag (5A), read all device ID headers and update its own local memory which stores the write permissions for the logical volumes to which it has access, from each port. The information is also stored in the non-volatile memory to be used, if necessary, during power-up (for example after a power failure) (steps 100, 102). The channel lock is also released at 109*b*, setting "L" to "O" (FIG. 4D). Note that after a logical volume has been write protected, then, any host connected to a channel director port, which no longer has write permission to that logical volume, will be unable to write data to that logical volume (although it can still read data from the logical volume). Any attempt by an authorized host to write data will be "rejected" by the channel director which provides a device unavailable response to the host.

In this illustrated embodiment of the invention, the write protect message has the granularity of the channel director ports. In a typical Symmetrix device, there can be up to 32 channel directors, each having up to four ports. In other embodiments of the invention, however, the granularity can be different.

In a preferred embodiment of the invention, the write protect status for the logical volumes available to a port of a channel director can also be modified from the console PC 22 over connecting channel 24. The PC console thus has the capability to modify and write to the various data structures and mailboxes associated with the channel directors, and to write protect data "on the fly" as a process is proceeding. This mechanism can be employed, for example, where a particular host computer 12 does not have available to it the command structure or application software which will enable it to modify the protection of one or more of the logical volumes for which it may have responsibility.

The host computers can remove write protection for a logical volume in the same manner in which write protection is added for the volume. This is clear from the mode select command described above. In that instance, the command to the channel director causes the channel director to reset a write protect bit, that is, for example to rewrite it as a "zero", following the general outline of operations illustrated in FIG. 3. The change in write protect status is then read as the channel directors periodically poll the global memory, read and recognize the set semaphore, read the device ID header data structures, and store the read data by updating their own respective internal memory 92 which defines the write permissions to which the channel director must adhere. The status data is also stored in each non-volatile memory 90).

Additions, subtractions, and other modifications of the preferred embodiment of the invention will be apparent to those of skill in the field and are within the scope of the following claims.

What is claimed is:

1. In a system having a plurality of host computers and at least one mass storage device having a controller for accessing a plurality of logical volumes, at least one of said logical volumes being able to be written to by at least two of said hosts at different controller ports, a method for changing the write protect status of a said logical volume comprising the steps of obtaining control of a write protect lock, in response to a host request, from a first host, for a change in write protect status for at least one selected logical volume, writing, in response to said first host, a write protect message to a logical volume memory location associated with each logical volume to be affected, setting a flag message in a message memory location indicating a change in said logical volume memory location, polling the message memory location for set flag messages, writing, in response to a set flag message, in a local memory associated with the controller port associated with the requesting host, a status of at least all logical volumes accessible from said port, and preventing, at the controller, a host from writing to a protected logical volume as identified by data in the said controller's local memory.

2. The method of claim 1 further comprising the steps of determining, from said host request, and a known configuration of the logical volumes and controller ports, including at least logical volume connections to said ports, thereby identifying for which ports to change the stored status of a logical volume.

3. The method of claim 1 further wherein said host does not have available to it the physical access configuration of the logical volumes and the ports.

4. The method of claim 1 further comprising the step of sending a message to the first host that a change in write protection status cannot be made when said lock control cannot be obtained.

5. The method of claim 1 further comprising the steps of providing a global memory in the controller containing said logical volume memory locations, providing a plurality of channel directors for receiving commands and data from host computers, each channel director having a plurality of ports, connecting each channel director to said global memory, providing a mailbox containing said message memory location, in said global memory, for each connected channel director, and each channel director periodically polling its mailbox for messages indicating a change of write protect status.

6. The method of claim 5 further comprising the step of writing, from each channel director, to mailboxes for each other channel director, for identifying a change of status of a logical volume to each other channel director.

7. The method of claim 5 further comprising the step of setting a semaphore for each said new message in said memory location for indicating a change in status of write protection.

8. The method of claim 5 further comprising the steps of reading said write protect memory locations associated with and accessible to a said channel director, in response to said polling step identifying a new message, and reading a write protect status header ID data for at least each logical volume visible from said channel director, on a port by port basis, and storing said status ID messages at said local memory at said channel director when new status write protection ID header data is available at said logical volume memory.

9. The method of claim 8 further comprising the step of storing said status ID header data in a non-volatile memory.

10. The method of claim 1 wherein said polling step comprises the step of
periodically polling said memory.

11. In a system having a plurality of host computers and at least one mass storage device having a controller for accessing a plurality of logical volumes, at least one of said logical volumes being able to be written to by at least two of said hosts at different controller ports, a method for changing the write protect status of a said logical volume comprising the steps of obtaining control of a write protect lock, in response to a host request, from a first host, for a change in write Protect status for at least one selected logical volume, writing, in response to said first host, a write protect message to a logical volume memory location associate with each logical volume to be affected, setting a flag message in a message memory location indicating a change in said logical volume memory location, polling the message memory location for set flag messages, writing, in response to a set flag message, in a local memory associated with the controller port associated with the requesting host, a status of at least all logical volumes accessible from said port, preventing, at the controller, a host from writing to a protected logical volume as identified by data in a said controller's local memory, and further wherein said request affects one of only a specified logical volume and all logical volumes which are accessible from the affected port, and wherein said request includes one of the following modes:
  a) no operation to be performed,
  b) a write enable for all logical volumes seen from the port,
  c) a write disable to effect all logical volume(s) seen from the port,
  d) a write enable for all logical volumes seen from the port and a write disable for these logical volumes seen from any other port, and
  e) a write disable for all logical volumes seen from the port and a write enable for these logical volumes seen from any other port.

12. A mass storage control system comprising
a global memory,
a plurality of channel directors, each channel director having at least one port and a local write status memory, each director being connected to said global memory and able to send and receive data and commands to and from at least one host computer, at each port, said global memory having a mailbox for each channel director to which it can read and write data, said global memory and said channel directors being configured so that each channel director can write data to each other channel director's mailbox in said global memory, each channel director ordinarily being able to receive data and commands from a host and write said data to a logical volume of a mass storage disk drive system having a plurality of logical volumes, each channel director, in response to a received logical volume write protect status change command from a host computer, obtaining a write protect lock, and writing a write protect status message to the mailbox within global memory of at least one channel director able to write to said logical volume, and writing any logical volume status change data to global memory, each channel director periodically polling its mailbox for new write protect status massages, and each channel director responding to a new write protect message in its mailbox in said global memory for modifying a write protect data structure in its local memory.

13. The control system of claim 12 further comprising
each said channel director in data communications with a non-volatile memory for storing said write protect data structure.

14. The control system of claim 12 further comprising
circuitry at the disk controller, responsive to a write protect status change command from the host, for determining for which logical volumes a write protect status shall change for each of the ports of the channel directors.

15. The control system of claim 12 further comprising said global memory having a section of memory for each said logical volume, and each section including a status word to which the control system can write status data on a port by port basis, the value of said status word identifying whether the corresponding logical volume is write protected to each channel director at a port level granularity.

16. The control system of claim 15 wherein said channel director further sets a semaphore in said global memory mailbox for itself and other channel directors when it writes a said write protect status message to any said global memory section.

17. The control system of claim 16 wherein said channel director responds to a set semaphore in its mailbox for reading said write status data for at least those logical volumes which it can access, and for storing each said write protect status data in its local memory and a non-volatile memory.

18. The control system of claim 12 wherein each said channel director, in response to a write request from a host connected at a port, queries its internal write privileges stored in its internal memory for that port, for determining whether it can direct a write data block to a specified logical volume.

19. The control system of claim 18 wherein said channel director, in response to a logical volume command for a host connected at a port, causes the write protect status messages of other directors connected to the global memory to be changed.

* * * * *